United States Patent
Okamoto

(10) Patent No.: US 11,796,407 B2
(45) Date of Patent: Oct. 24, 2023

(54) LOAD TRANSDUCER

(71) Applicant: MINEBEA MITSUMI Inc., Nagano (JP)

(72) Inventor: Takuma Okamoto, Fujisawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 395 days.

(21) Appl. No.: 17/263,618

(22) PCT Filed: Jul. 4, 2019

(86) PCT No.: PCT/JP2019/026618
§ 371 (c)(1),
(2) Date: Jan. 27, 2021

(87) PCT Pub. No.: WO2020/026691
PCT Pub. Date: Feb. 6, 2020

(65) Prior Publication Data
US 2021/0293635 A1 Sep. 23, 2021

(30) Foreign Application Priority Data
Jul. 30, 2018 (JP) .................................. 2018-142500

(51) Int. Cl.
*G01L 1/00* (2006.01)
*G01L 1/26* (2006.01)
(Continued)

(52) U.S. Cl.
CPC .............. *G01L 1/26* (2013.01); *G01L 1/2262* (2013.01); *B25J 19/02* (2013.01)

(58) Field of Classification Search
CPC ........... G01L 1/26; G01L 1/2262; B25J 19/02
(Continued)

(56) References Cited

U.S. PATENT DOCUMENTS 7,594,445 B2 * 9/2009 Hirabayashi .............. G01L 1/26
73/862.041
8,161,828 B1 4/2012 Clegg et al.
(Continued)

FOREIGN PATENT DOCUMENTS

JP 590027853 B 7/1979
JP S55167137 U 12/1980
(Continued)

OTHER PUBLICATIONS

Decision to Grant a Patent dated Nov. 8, 2021 for corresponding Japanese Application No. 2018-142500 and English translation.
(Continued)

*Primary Examiner* — Max H Noori
(74) *Attorney, Agent, or Firm* — Pearne & Gordon LLP

(57) ABSTRACT

A load transducer includes a block body and a strain gauge attached to the block body. The block body includes a plurality of fixing portions fixed to a support member, a plurality of movable portions provided respectively between the plurality of fixing portions and receiving a load from an external member, and a plurality of beam portions extending respectively between the fixing portions and the movable portions, the block body being formed in a tubular shape. The movable portions include a plurality of movable-portion protrusions receiving the load from the external member, and the fixing portions include a plurality of movable-portion regulation protrusions provided between the plurality of movable-portion protrusions to regulate displacement of the movable portions.

10 Claims, 10 Drawing Sheets

(51) Int. Cl.
*G01L 1/22* (2006.01)
*B25J 19/02* (2006.01)

(58) Field of Classification Search
USPC .................................................. 73/862.045
See application file for complete search history.

(56) References Cited

U.S. PATENT DOCUMENTS

| | | | |
|---|---|---|---|
| 11,079,216 B2* | 8/2021 | Ye ......................... | B21L 15/005 |
| 11,287,335 B2* | 3/2022 | Mukai ...................... | G01L 3/00 |
| 2002/0010990 A1* | 1/2002 | Takeuchi ............. | H10N 30/074 |
| | | | 29/25.35 |
| 2004/0056748 A1* | 3/2004 | Masaki .................... | B62D 6/10 |
| | | | 336/119 |
| 2013/0139615 A1* | 6/2013 | Kwom .................. | G01L 5/1627 |
| | | | 156/196 |
| 2014/0144252 A1* | 5/2014 | Kim .......................... | G01L 1/26 |
| | | | 73/862.338 |
| 2019/0094086 A1* | 3/2019 | Okada ..................... | G01L 1/142 |
| 2020/0256750 A1* | 8/2020 | Okada ........................ | G01L 1/14 |
| 2021/0404890 A1* | 12/2021 | Kosaka .................. | G01L 1/2262 |
| 2022/0316968 A1* | 10/2022 | Jiang ..................... | G01L 5/0061 |

FOREIGN PATENT DOCUMENTS

| | | |
|---|---|---|
| JP | S55167138 U | 12/1980 |
| JP | 2007-315923 A | 12/2007 |
| JP | 4933838 B2 | 5/2012 |
| JP | 5411614 B | 2/2014 |
| JP | 5490619 B | 5/2014 |

OTHER PUBLICATIONS

International Search Report for corresponding International Application No. PCT/JP2019/026618 dated Jul. 30, 2019.
Written Opinion for corresponding International Application No. PCT/JP2019/026618 dated Jul. 30, 2019.
International Preliminary Report on Patentability or corresponding International Application No. PCT/JP2019/026618 dated Feb. 2, 2021.
Notice of Reasons for Refusal dated Aug. 16, 2021 for corresponding Japanese Application No. 2018-142500 and English translation.

\* cited by examiner

LOAD TRANSDUCER

TECHNICAL FIELD

The present invention relates to a load transducer, and more particularly to a load transducer configured to convert a load into an electrical signal.

BACKGROUND ART

Conventionally, a Roberval-type load transducer having a Roberval mechanism has been widely known in a load transducer (load cell) used for a robot arm. Such a load transducer includes a metallic block body used as a Roberval-type strain body. Such a block body is, for example, a washer-type load transducer having a hollow shape (cylindrical shape), and is configured such that wiring or a shaft of a motor passes through the inside of the hollow shape (For example, see Patent Literature 1).

DOCUMENT LIST

Patent Literature

Patent Literature 1: Japanese Patent Application Publication No. 2007-315923

SUMMARY OF INVENTION

Technical Problem

However, in the load transducer used for such a robot arm, for example, when the robot arm grips and lifts an object, a load is not evenly applied and an unbalanced load is applied. Then, when an unbalanced load is applied to the load transducer, the output of the load transducer may fluctuate greatly due to the unbalanced load, and the output may vary. Further, when the unbalanced load is applied to the load transducer, a portion having a large load may be overloaded, and the block body of the load transducer may be damaged. As described above, the conventional load transducer is required to have a structure capable of preventing output variations and damage of the load transducer even when an unbalanced load or an overload occurs.

It is an object of the present invention to provide a load transducer capable of preventing output variations and damage of the load transducer even when an unbalanced load or an overload occurs.

Solution to Problem

In order to achieve the above-described object, a load transducer according to the present invention includes: a block body; and a strain gauge attached to the block body, wherein the block body includes a plurality of fixing portions to be fixed to a support member, a plurality of movable portions provided respectively between the plurality of fixing portions and receiving a load from an external member, and a plurality of beam portions extending respectively between the fixing portions and the movable portions, the block body being formed in a tubular shape, the movable portions include a plurality of movable-portion protrusions receiving the load from the external member, and the fixing portions include a plurality of movable-portion regulation protrusions provided between the plurality of movable-portion protrusions to regulate displacement of the movable portions.

In the load transducer according to one aspect of the present invention, the fixing portions include a plurality of fixing-portion protrusions supported by the support member, and the movable portions include a plurality of fixing-portion regulation protrusions provided between the plurality of fixing-portion protrusions to regulate displacement of the fixing portions.

In the load transducer according to one aspect of the present invention, each of the plurality of beam portions includes an external member-side beam member provided closer to the external member, each of the external member-side beam members includes a movable portion protrusion-side strain portion provided closer to the movable-portion protrusion and a movable portion regulation protrusion-side strain portion provided closer to the movable-portion regulation protrusion, and strain gauges are respectively attached to movable portion regulation protrusion-side strain portions on both sides of one movable-portion regulation protrusion among a plurality of movable-portion regulation protrusions.

In the load transducer according to one aspect of the present invention, among the plurality of movable-portion regulation protrusions, strain gauges are respectively attached to movable portion protrusion-side strain portions on both sides of a movable-portion regulation protrusion adjacent to the movable-portion regulation protrusion including the movable portion regulation protrusion-side strain portions provided on both sides and attached with the strain gauges.

In the load transducer according to one aspect of the present invention, among the plurality of movable-portion regulation protrusions, strain gauges are respectively attached to movable-portion regulation protrusion-side strain portions on both sides of a movable-portion regulation protrusion facing the movable-portion regulation protrusion including the movable portion regulation protrusion-side strain portions provided on both sides and attached with the strain gauges.

In the load transducer according to one aspect of the present invention, the plurality of beam portions respectively include support member-side beam members provided closer to the support member, each of the support member-side beam members includes a fixing portion protrusion-side strain portion provided closer to the fixing-portion protrusion and a fixing portion regulation protrusion-side strain portion provided closer to the fixing-portion regulation protrusion, and strain gauges are respectively attached to fixing portion protrusion-side strain portions on both sides of one fixing-portion protrusion among the plurality of fixing-portion protrusions.

In the load transducer according to one aspect of the present invention, among the plurality of fixing-portion protrusions, strain gauges are respectively attached to fixing portion regulation protrusion-side strain portions on both sides of a fixing-portion protrusion adjacent to the fixing-portion protrusion including the fixing portion protrusion-side strain portions on both sides and attached with the strain gauges.

In the load transducer according to one aspect of the present invention, among the plurality of fixing-portion protrusions, strain gauges are respectively attached to fixing portion protrusion-side strain portions on both sides of a fixing-portion protrusion facing the fixing-portion protrusion including the fixing portion protrusion-side strain portions on both sides and attached with the strain gauges.

In the load transducer according to one aspect of the present invention, the strain gauges attached to the fixing portion protrusion-side strain portions and the fixing portion regulation protrusion-side strain portions form a bridge circuit.

In the load transducer according to one aspect of the present invention, the strain gauges are attached to the movable portion regulation protrusion-side strain portions and the movable portion protrusion-side strain portions side by side on an inner side and an outer side in a radial direction, respectively, and the strain gauges on the outer side and the inner side in the radial direction form two bridge circuits.

In the load transducer according to one aspect of the present invention, a plurality of strain gauges attached to the external member-side beam member and a plurality of strain gauges attached to the support member-side beam portion are disposed at corresponding positions in an axis direction of the block body.

Effects of Invention

According to a load transducer of the present invention, it is possible to prevent output variations and damage of the load transducer even when an unbalanced load or an overload occurs.

DESCRIPTION OF EMBODIMENT

Hereinafter, an embodiment of the present invention will be described with reference to the drawings.

Figure 1:
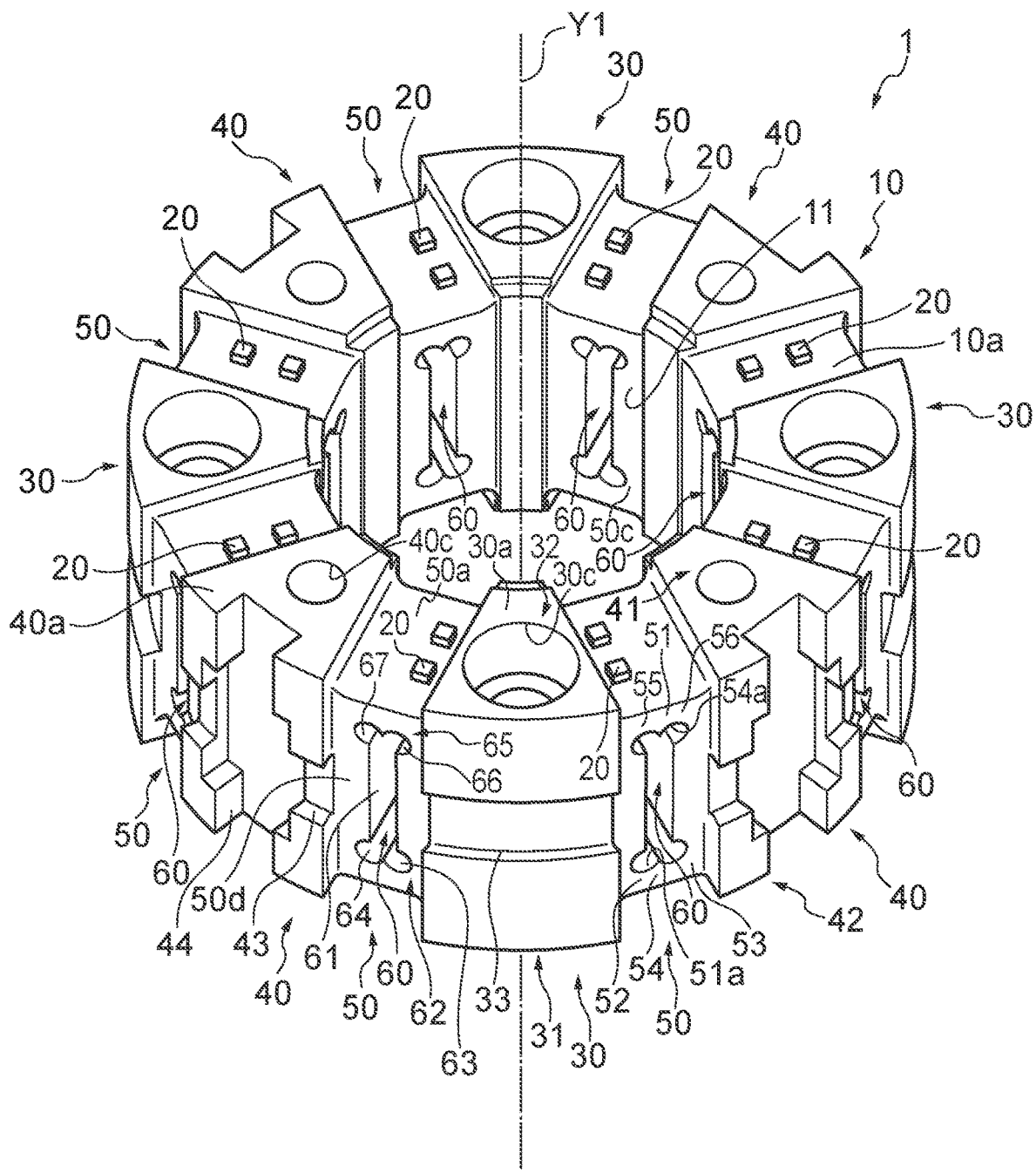
FIG. 1 A perspective view schematically showing a configuration of a load transducer according to an embodiment of the present invention.
Figure 2:
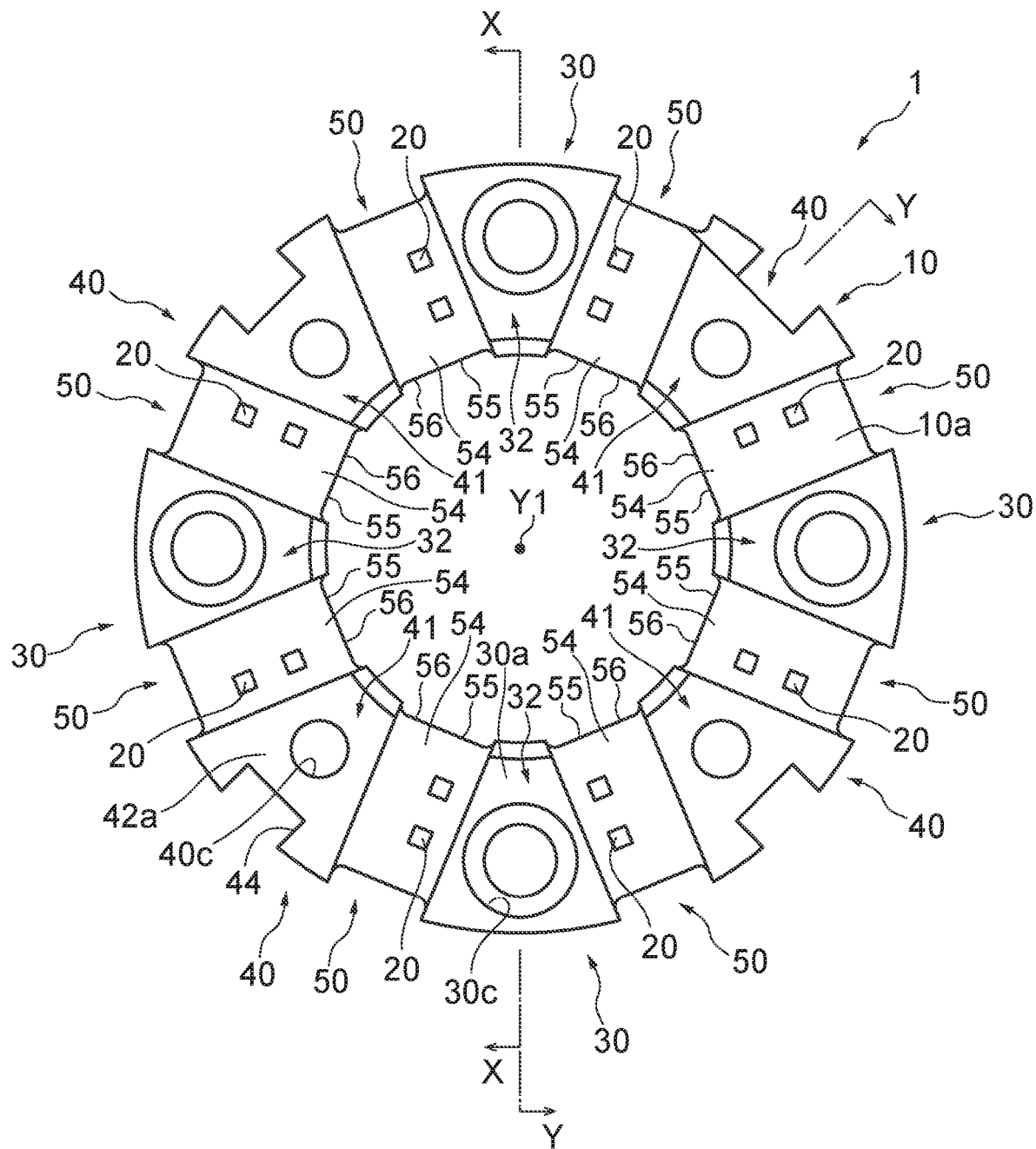
FIG. 2 A plan view schematically showing the configuration the load transducer according to the embodiment of the present invention.
Figure 3:
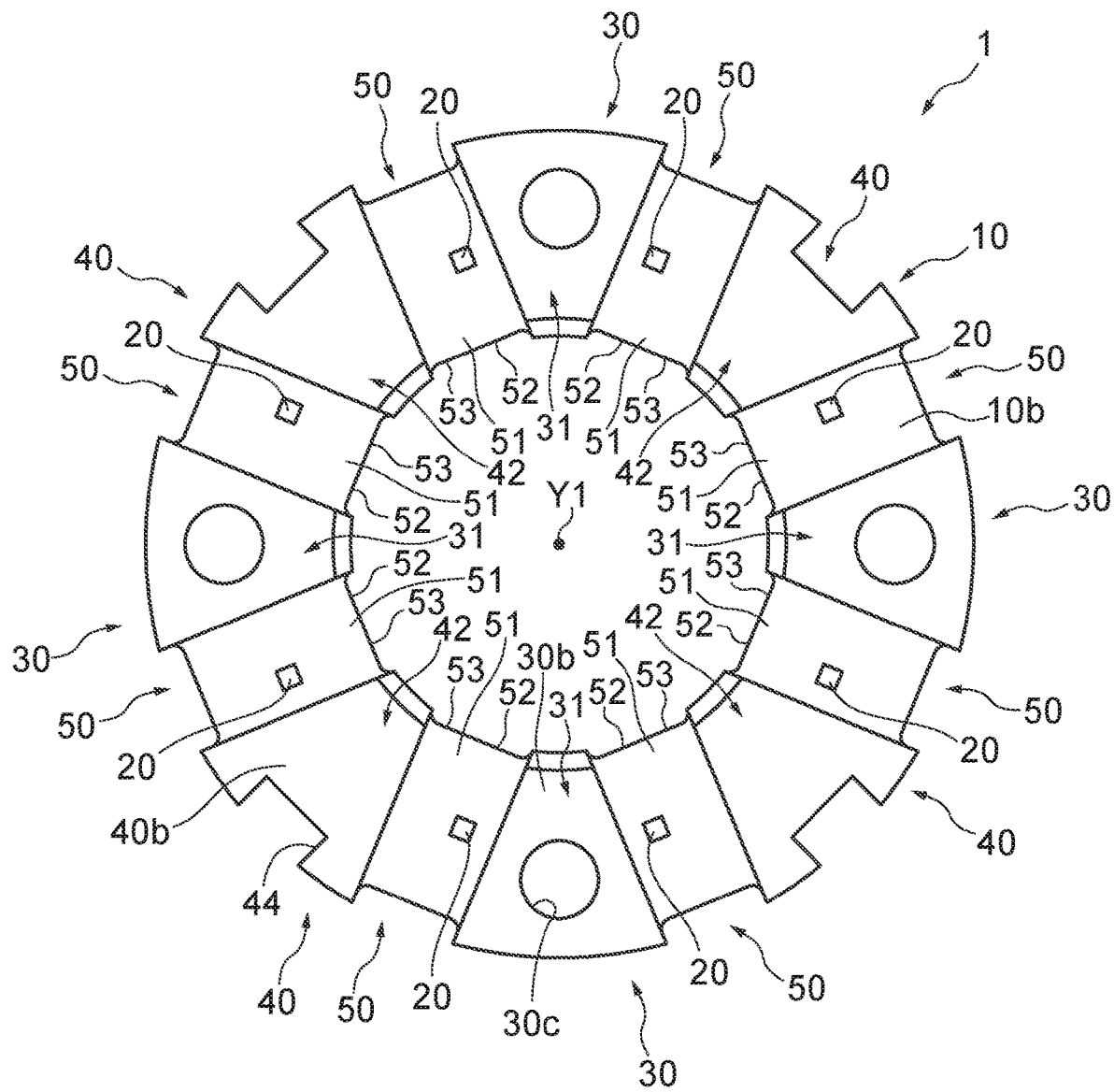
FIG. 3 A bottom view schematically showing the configuration of the load transducer according to the embodiment of the present invention.
Figure 4:
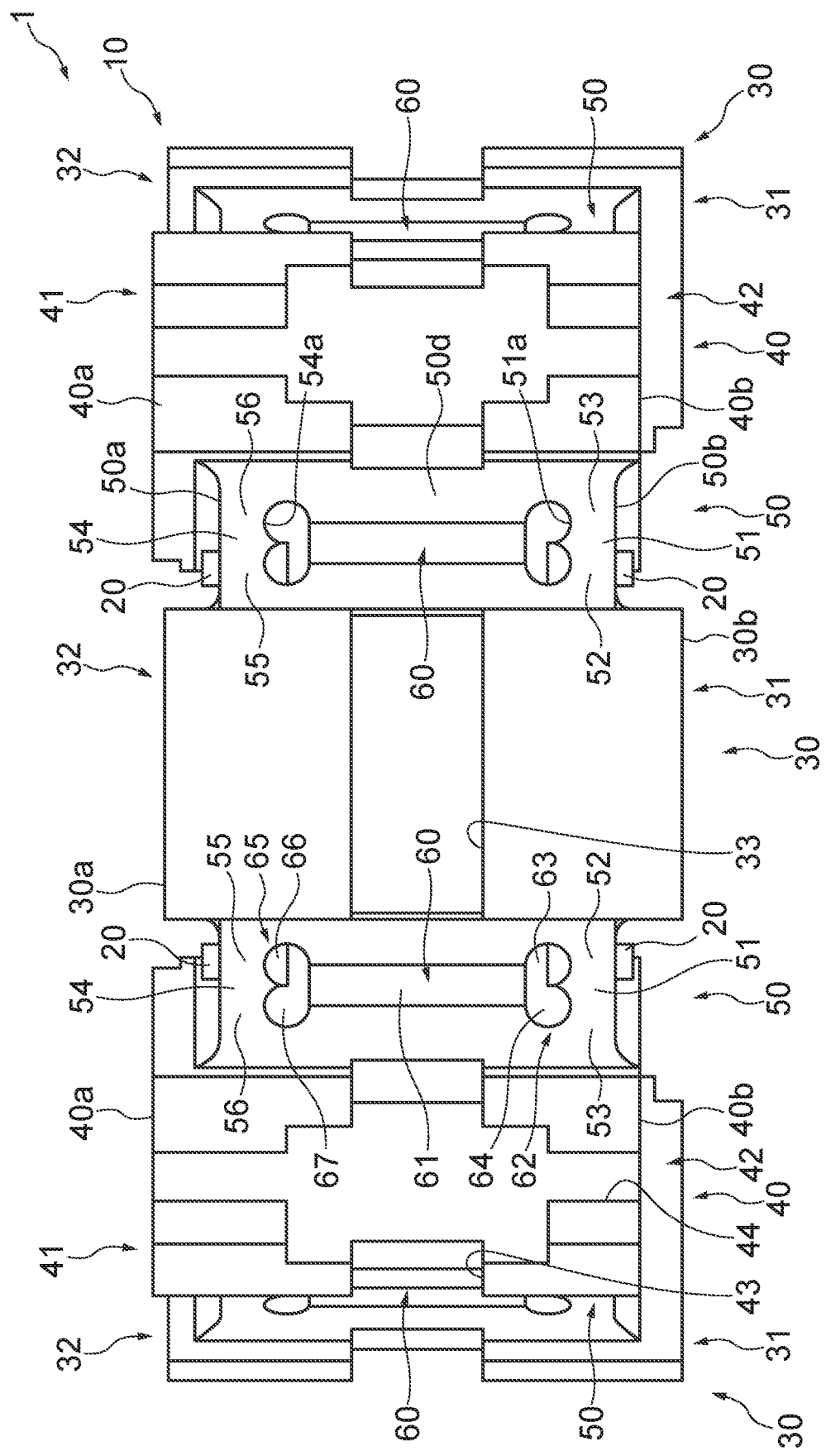
FIG. 4 A side view schematically showing the configuration of the load transducer according to the embodiment of the present invention.
Figure 5:
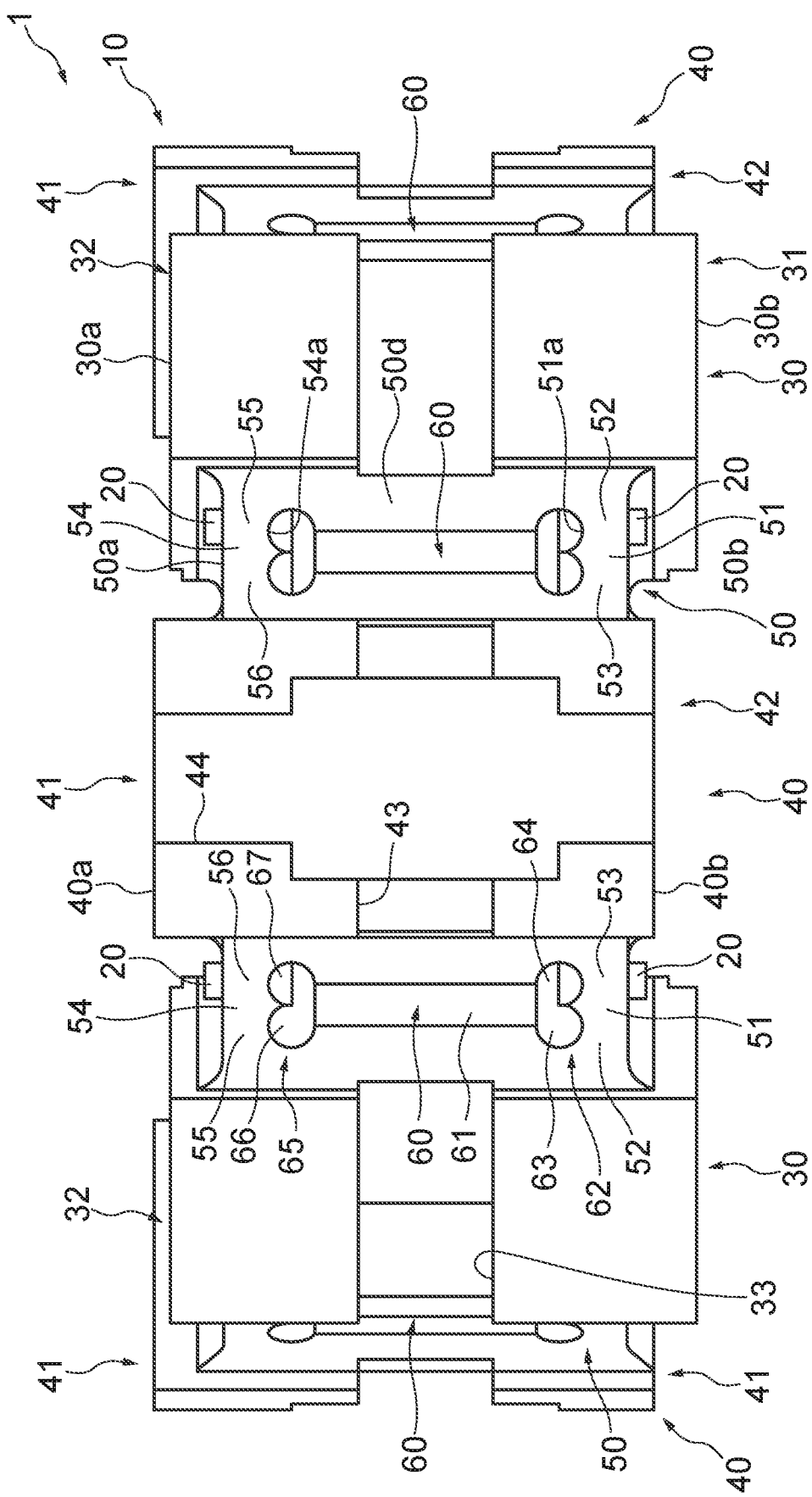
FIG. 5 A side view schematically showing the configuration of the load transducer according to the embodiment of the present invention when viewed from another angle.
Figure 6:
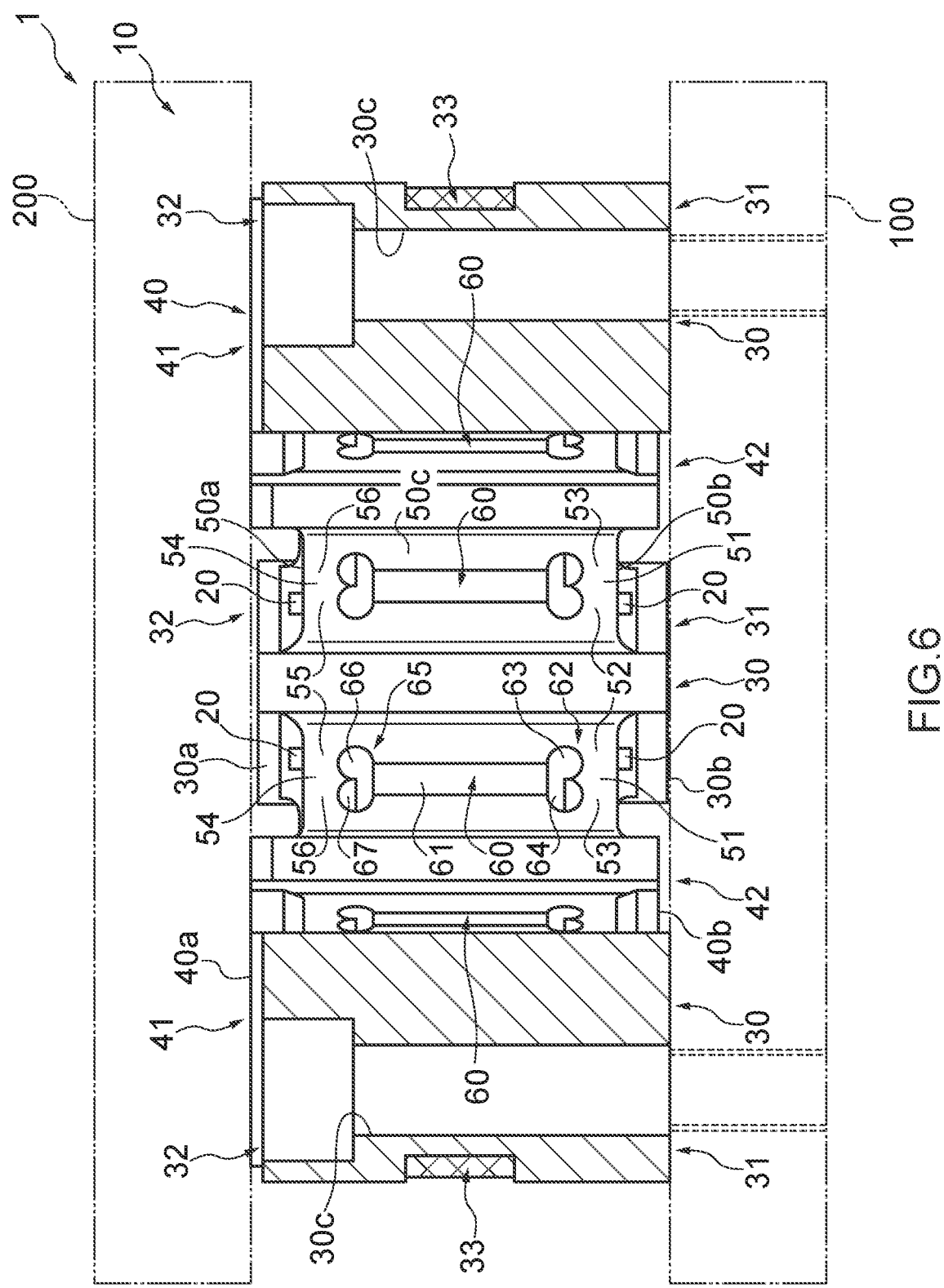
FIG. 6 A schematically cross-sectional view taken along a line X-X in the configuration of the load transducer shown in FIG. 2.
Figure 7:
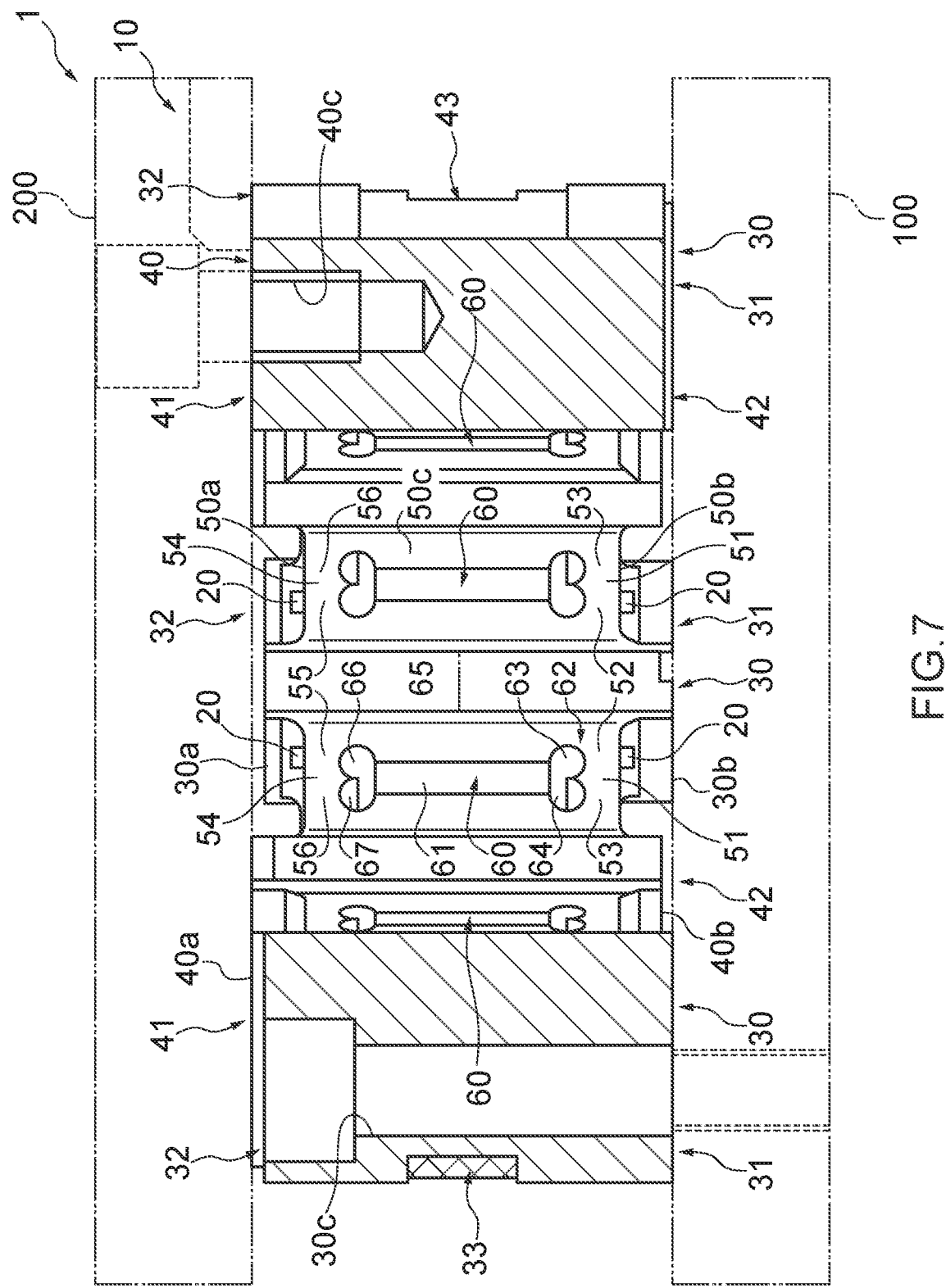
FIG. 7 A schematically cross-sectional view taken along a line Y-Y in the configuration of the load transducer shown in FIG. 2.

FIG. 1 is a perspective view schematically showing a configuration of a load transducer 1 according to the embodiment of the present invention, and FIG. 2 is a plan view schematically showing the configuration of the load transducer 1. FIG. 3 is a bottom view schematically showing the configuration of the load transducer 1, and FIG. 4 is a side view schematically showing the configuration of the load transducer 1. FIG. 5 is a side view schematically showing the configuration of the load transducer 1 when viewed from another angle. FIG. 6 is a schematically cross-sectional view taken along a line X-X in the configuration of the load transducer 1 shown in FIG. 2, and FIG. 7 is a schematically cross-sectional view taken along a line Y-Y in the configuration of the load transducer 1 shown in FIG. 2.

The load transducer 1 of the embodiment of the present invention is attached, for example, between a base portion (an external member 200 (FIGS. 6 and 7)) of a robot arm and a support member 100 (FIGS. 6 and 7), and plays a role of detecting a load applied to the robot arm when the robot arm grabs and lifts an object. The load transducer 1 according to the embodiment of the present invention is applied to various targets without being limited to the above description.

The load transducer 1 according to the embodiment of the present invention includes a block body 10 and a strain gauge 20 attached to the block body 10. The block body 10 is formed in a tubular shape, and includes a plurality of fixing portions 30 fixed to the support member 100 (FIGS. 6 and 7), a plurality of movable portions 40 provided between the plurality of fixing portions 30, respectively, and receiving a load from the external member 200 (FIGS. 6 and 7), and a plurality of beam portions 50 extending between the fixing portions 30 and the movable portions 40, respectively.

The movable portion 40 includes a plurality of movable-portion protrusions 41 that receives the load from the external member 200, and the fixing portion 30 includes a plurality of movable-portion regulation protrusions 32 that are provided between the plurality of movable-portion protrusions 41 to regulate displacement of the movable portion 40. In addition, the fixing portion 30 includes a plurality of fixing-portion protrusions 31 that are supported by the support member 100, and the movable portion 40 includes a plurality of fixing-portion regulation protrusions 42 that are provided between the plurality of fixing-portion protrusions 31 to regulate displacement of the fixing portion 30. Hereinafter, the configuration of the load transducer 1 will be described in detail.

The block body 10 has an outer shape formed in a substantially columnar shape, and includes a substantially columnar opening 11 formed in a center thereof. In other words, the block body 10 is formed in a hollow shape (cylindrical shape) as a whole. The block body 10 is integrally formed of a metal material such as aluminum or iron. In other words, the fixing portion 30, the movable portion 40, and the beam portion 50 are respective portions of the block body 10 integrally formed of the same material.

In the block body 10, each of the plurality of fixing portions 30 has an outer shape in which an inner peripheral side having a substantially fan shape is cut off, and extends in a direction of an axis Y1 that is a central axis of the block body 10. On an outer peripheral surface of each of the plurality of fixing portions 30, each of grooves 33 extends in a circumferential direction of the axis Y1 of the block body 10 in the central part in the direction of the axis Y1 of the block body 10 and is recessed from an outer peripheral surface to an inner peripheral side of the fixing portion 30. The groove 33 is formed to accommodate a cable (not shown) connected to the strain gauge 20, thereby forming Wheatstone bridge circuits W1 to W3 to be described below.

Each of the plurality of fixing portions 30 includes a facing surface 30a which is a surface facing the external member 200 and a facing surface 30b which is a surface facing the support member 100. As shown in FIG. 6, each of the plurality of fixing portions 30 is formed with a columnar through hole 30c that penetrates the facing surfaces 30a and 30b at a central part of the facing surfaces 30a and 30b and has a step. The through hole 30c is formed to fix the block body 10 and the support member 100 with screws.

The plurality of fixing portions 30 are provided concentrically or substantially concentrically from the axis Y1 of the block body 10 at equiangular intervals or substantially equiangular intervals, and form a wall surface of the block body 10. Specifically, four fixing portions 30 are provided concentrically or substantially concentrically from the axis Y1 of the block body 10 at 90-degree intervals. Two fixing portions 30 of the four fixing portions 30 face to each other in a radial direction of the block body 10. Details of the plurality of fixing-portion protrusion 31 and the plurality of movable-portion regulation protrusions 32 of the plurality of fixing portions 30 will be described below.

In the block body 10, each of the plurality of movable portions 40 has an outer shape in which an inner peripheral side having a substantially fan shape is cut off, and extends in the direction of the axis Y1 of the block body 10. On an outer peripheral surface of each of the plurality of movable portions 40, each of grooves 43 extends in the circumferential direction of the axis Y1 of the block body 10 in the central part in the direction of the axis Y1 of the block body 10 and is recessed from an outer peripheral surface to an inner peripheral side of the movable portion 40. On the outer peripheral surface of each of the plurality of movable portions 40, each of grooves 44 extends in the direction of the axis Y1 of the block body 10 in the central part in the circumferential direction of the axis Y1 of the block body 10 and is recessed from the outer peripheral surface to the inner peripheral side of the movable portion 40. The grooves 43 and 44 are formed to accommodate the cable (not shown) connected to the strain gauge 20, thereby forming Wheatstone bridge circuits W1 to W3 to be described below.

Each of the plurality of movable portions 40 includes a facing surface 40a which is a surface facing the external member 200 and a facing surface 40b which is a surface facing the support member 100. As shown in FIG. 7, each of the plurality of movable portions 40 is formed with a columnar bottomed hole 40c that extends from the facing surface 30a to the facing surface 30b at the central part of the facing surface 30a. The bottomed hole 40c is formed to fix the block body 10 and the external member 200 with bolts.

The plurality of movable portions 40 are provided concentrically or substantially concentrically from the axis Y1 of the block body 10 at equiangular intervals or substantially equiangular intervals, and form the wall surface of the block body 10. Further, the plurality of movable portions 40 is provided between the plurality of fixing portions 30, respectively, in the circumferential direction of the axis Y1 of the block body 10. Specifically, four movable portions 40 are provided concentrically or substantially concentrically from the axis Y1 of the block body 10 at 90-degree intervals. In addition, the four movable portions 40 are provided so as to be shifted by 45 degrees from the four fixing portions 30 in the circumferential direction of the block body 10, respectively. Two movable portions 40 of the four movable portions 40 face to each other in the radial direction of the block body 10. Details of the plurality of movable-portion protrusion 41 and the plurality of fixing-portion regulation protrusions 42 of the plurality of movable portions 40 will be described below.

In the block body 10, each of the plurality of beam portions 50 has an outer shape which is formed in a substantially rectangular parallelepiped shape, and extends in the direction of the axis Y1 of the block body 10. Each of the plurality of beam portions 50 includes a facing surface 50a that is a surface facing the external member 200 and a facing surface 50b that is a surface facing the support member 100. The facing surface 50a of each of the plurality of beam portions 50 forms an external member-side end surface 10a that is an end surface of the block body 10 closer to the external member 200. The facing surface 50b of each of the plurality of beam portions 50 forms a support member-side end surface 10b that is an end surface of the block body 10 closer to the support member 100.

In the plurality of fixing portions 30, portions protruding toward the support member 100 from the support member-side end surface 10b of the block body 10 are formed as the plurality of fixing-portion protrusions 31, respectively. Each of the plurality of fixing-portion protrusions 31 is in contact with the support member 100 on the facing surface 30b of the fixing portion 30 and is fixed to the support member 100 with bolts.

In the plurality of movable portions 40, portions protruding toward the support member 100 from the support member-side end surface 10b of the block body 10 are formed as the plurality of fixing-portion regulation protrusions 42, respectively. Heights of the plurality of fixing-portion regulation protrusions 42 in the direction of the axis Y1 are lower than heights of the plurality of fixing-portion protrusions 31 in the direction of the axis Y1. The plurality of fixing-portion regulation protrusions 42 are away from the support member 100, and are in contact with the support member 100 when an unbalanced load or an overload occurs on the robot arm (external member 200). In other words, the plurality of fixing-portion regulation protrusions 42 serve as stoppers.

In the plurality of movable portions 40, portions protruding toward the external member 200 from the external member-side end surface 10a of the block body 10 are formed as the plurality of movable-portion protrusions 41, respectively. Each of the plurality of movable-portion protrusions 41 is in contact with the external member 200 on the facing surface 40a of the movable portion 40 and is fixed to the external member 200 with bolts.

In the plurality of fixing portions 30, portions protruding toward the external member 200 from the external member-side end surface 10a of the block body 10 are formed as the plurality of movable-portion regulation protrusions 32, respectively. Heights of the plurality of movable-portion regulation protrusions 32 in the direction of the axis Y1 are lower than heights of the plurality of movable-portion protrusions 41 in the direction of the axis Y1. The plurality of movable-portion regulation protrusions 32 are away from the external member 200, and are in contact with the external member 200 when an unbalanced load or an overload occurs on the robot arm (external member 200). In other words, the plurality of movable-portion regulation protrusions 32 serve as stoppers.

Each of the plurality of beam portions 50 includes an inner peripheral surface 50c that is a surface on an inner peripheral side of the beam portion 50 and an outer peripheral surface 50d that is a surface on an outer peripheral side of the beam portion 50. Each of the plurality of beam portions 50 is formed with a so-called bone-shaped through hole 60 that penetrates the inner peripheral surface 50c and the outer peripheral surface 50d at a central part of the inner peripheral surface 50c and the outer peripheral surface 50d.

Specifically, the through hole 60 includes a slit hole 61, a support member-side coupling hole 62, and an external member-side coupling hole 65. The slit hole 61 extends in a rectangular parallelepiped shape in the radial direction of block body 10 at the central part of the inner peripheral surface 50c and the outer peripheral surface 50d. The support member-side coupling hole 62 is formed to be coupled to the slit hole 61 on the support member 100. The external member-side coupling hole 65 is formed to be coupled to the slit hole 61 on the external member 200.

The support member-side coupling hole 62 includes, a fixing portion protrusion-side coupling hole 63 located closer to the fixing-portion protrusion 31 of the fixing portion 30 and extending in a columnar shape in the radial direction of the block body 10 and a fixing portion regulation protrusion-side coupling hole 64 located closer to the fixing-portion regulation protrusion 42 of the movable portion 40 and extending in a columnar shape in the radial direction of the block body 10. The external member-side coupling hole 65 includes a movable portion regulation protrusion-side coupling hole 66 located closer to the movable-portion regulation protrusion 32 of the fixing portion 30 and extending in a columnar shape in the radial direction of the block body 10 and a movable portion protrusion-side coupling hole 67 located closer to the movable-portion protrusion 41 of the movable portion 40 and extending in a columnar shape in the radial direction of the block body 10.

In other words, each of the plurality of beam portions 50 includes a support member-side beam member 51 that is a beam member closer to the support member 100 and an external member-side beam member 54 that is a beam member closer to the external member 200. The support member-side beam member 51 and the external member-side beam member 54 are symmetrical or substantially symmetrical to each other. Each of the support member-side beam member 51 and the external member-side beam member 54 is a plate-shaped portion extending between the fixing portion 30 and the movable portion 40, and extends to be orthogonal to or substantially orthogonal to the fixing portion 30 and the movable portion 40.

The support member-side beam member 51 includes a fixing portion protrusion-side strain portion 52 that is an strain portion closer to the fixing-portion protrusion 31 of the fixing portion 30 and a fixing portion regulation protrusion-side strain portion 53 that is an strain portion closer to the fixing-portion regulation protrusion 42 of the movable portion 40. Each of the fixing portion protrusion-side strain portion 52 and the fixing portion regulation protrusion-side strain portion 53 of the support member-side beam member 51 extends in the radial direction of the block body 10.

The fixing portion protrusion-side strain portion 52 and the fixing portion regulation protrusion-side strain portion 53 of the support member-side beam member 51 are formed in such a manner that an inside surface 51a of the support member-side beam member 51 is recessed toward the support member 100 by the fixing portion protrusion-side coupling hole 63 and the fixing portion regulation protrusion-side coupling hole 64. In other words, the fixing portion protrusion-side strain portion 52 and the fixing portion regulation protrusion-side strain portion 53 of the support member-side beam member 51 are thin-walled portions formed by a surface of the inside surface 51a recessed in an arc shape toward the support member 100.

The external member-side beam member 54 includes a movable portion regulation protrusion-side strain portion 55 that is an strain portion closer to the movable-portion regulation protrusion 32 of the fixing portion 30 and a movable portion protrusion-side strain portion 56 that is an strain portion closer to the movable-portion protrusion 41 of the movable portion 40. Each of the movable portion regulation protrusion-side strain portion 55 and the movable portion protrusion-side strain portion 56 of the external member-side beam member 54 extends in the radial direction of the block body 10.

The movable portion regulation protrusion-side strain portion 55 and the movable portion protrusion-side strain portion 56 of the external member-side beam member 54 are formed in such a manner that an inside surface 54a of the external member-side beam member 54 is recessed toward the external member 200 by the movable portion regulation protrusion-side coupling hole 66 and the movable portion protrusion-side coupling hole 67. In other words, the movable portion regulation protrusion-side strain portion 55 and the movable portion protrusion-side strain portion 56 of the external member-side beam member 54 are thin-walled portion formed by a surface of the inside surface 54a recessed in an arc shape toward the external member 200.

The plurality of beam portions 50 are provided concentrically or substantially concentrically from the axis Y1 of the block body 10 at equiangular intervals or substantially equiangular intervals, and form the wall surface of the block body 10. In addition, the plurality of beam portions 50 are provided between the fixing portion 30 and the movable portion 40, respectively, in the circumferential direction of the axis Y1 of the block body 10.

Specifically, eight beam portions 50 are provided concentrically or substantially concentrically from the axis Y1 of the block body 10 at 45-degree intervals. Further, the plurality of beam portions 50 are provided so as to be shifted by 22.5 degrees from each of four fixing portions 30 and four movable portions 40 in the circumferential direction of the block body 10. Two beam portions 50 of the eight beam portions 50 face each other in the radial direction of the block body 10.

The strain gauge 20 is attached to the fixing portion protrusion-side strain portion 52 and the fixing portion regulation protrusion-side strain portion 53 of the support member-side beam member 51 from the support member-side end surface 10b. In addition, the strain gauge 20 is attached to the movable portion regulation protrusion-side strain portion 55 and the movable portion protrusion-side strain portion 56 of the external member-side beam member 54 from the external member-side end surface 10a. The plurality of strain gauges 20 attached to the movable portion regulation protrusion-side strain portion 55 and the movable portion protrusion-side strain portion 56 of the external member-side beam member 54 and the plurality of strain gauges 20 attached to the fixing portion protrusion-side strain portion 52 and the fixing portion regulation protrusion-side strain portion 53 of the support member-side beam member 51 are disposed at corresponding positions in the direction of the axis Y1 of the block body 10.

Figure 8:
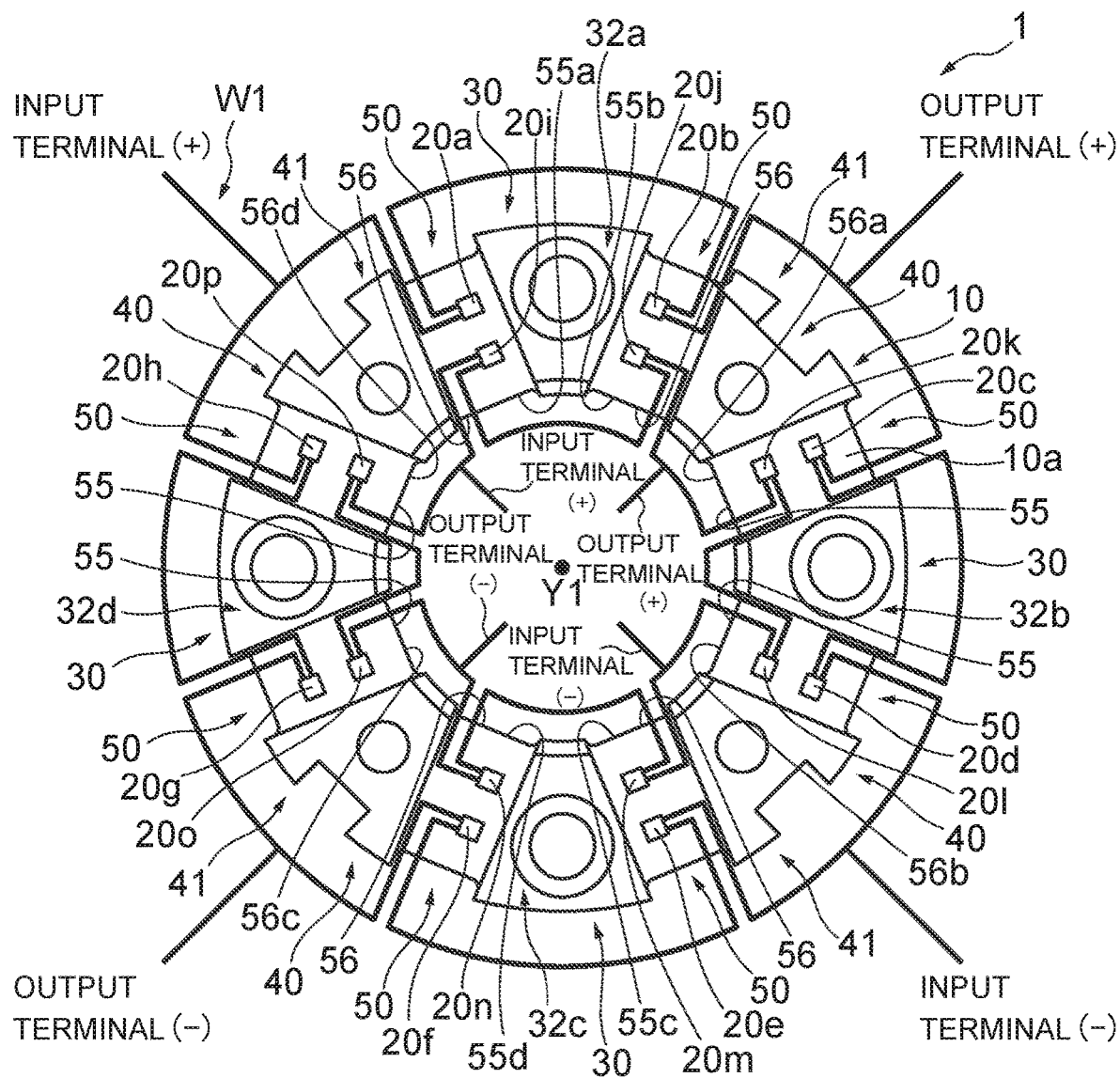
FIG. 8 A plan view schematically showing a position and a wiring configuration of a strain gauge of the load transducer according to the embodiment of the present invention.
Figure 9:
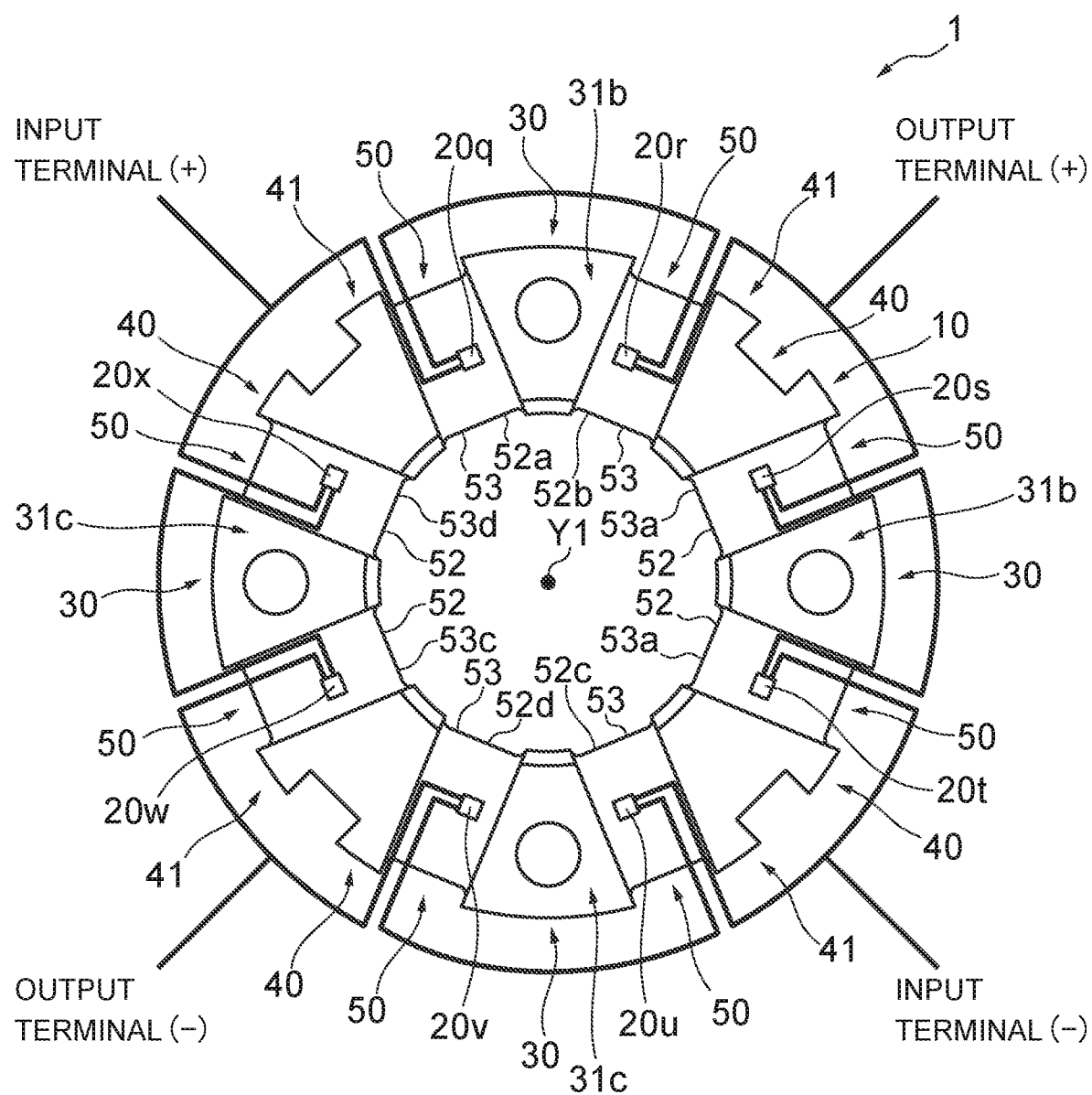
FIG. 9 A bottom view schematically showing the position and the wiring configuration of the strain gauge of the load transducer according to the embodiment of the present invention.
Figure 10:
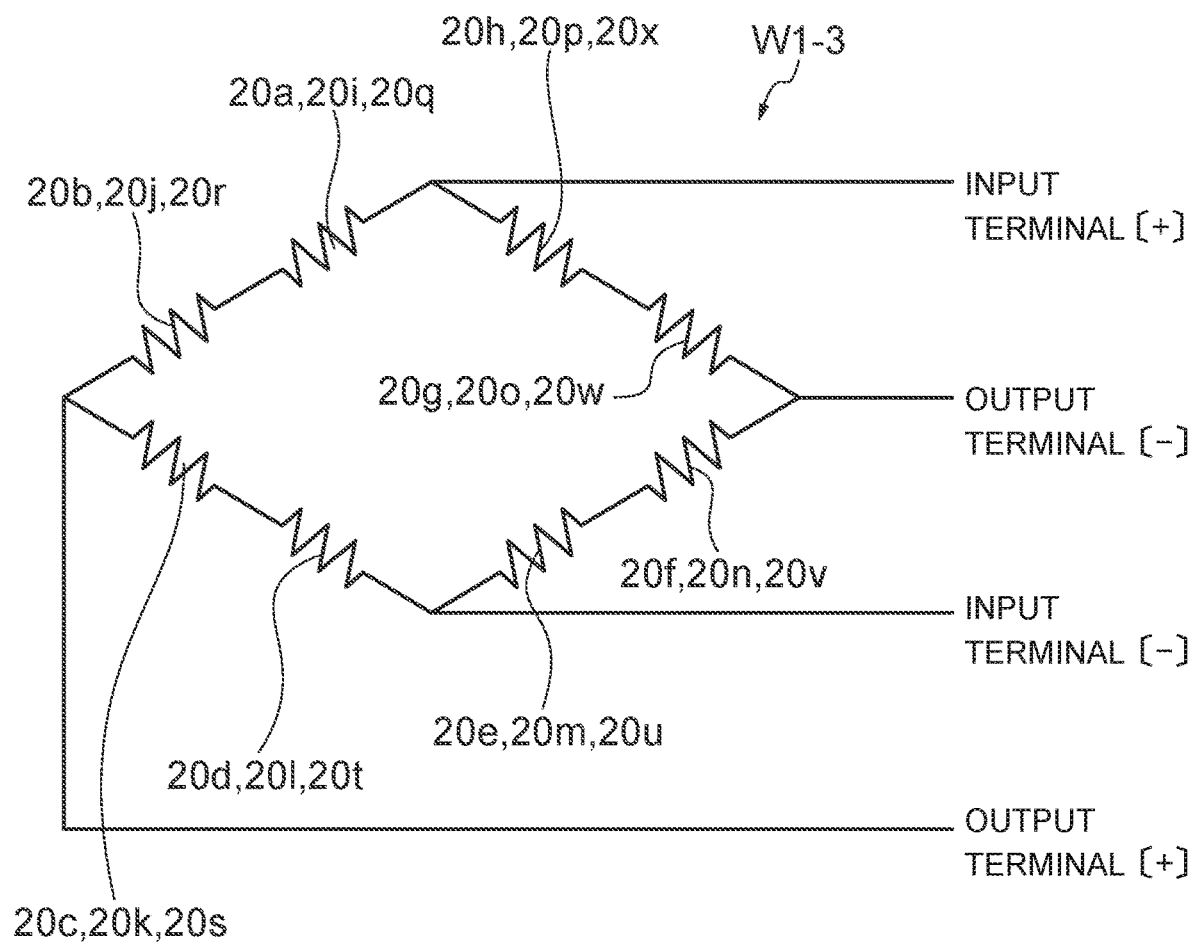
FIG. 10 An electric circuit diagram showing Wheatstone bridge circuits formed by the strain gauge of the load transducer according to the embodiment of the present invention.

FIG. 8 is a plan view schematically showing a position and a wiring configuration of the strain gauge 20 of the load transducer 1 according to the embodiment of the present invention, and FIG. 9 is a bottom view schematically showing the position and the wiring configuration of the strain gauge 20 of the load transducer 1. FIG. 10 is an electric circuit diagram showing the Wheatstone bridge circuits W1 to W3 formed by the strain gauge 20 of the load transducer 1.

In the load transducer 1 according to the embodiment of the present invention, the strain gauges 20 are respectively attached to the movable portion regulation protrusion-side strain portions 55 on both sides of one movable-portion regulation protrusion 32 among the plurality of movable-portion regulation protrusions 32. Further, the strain gauges 20 are respectively attached to the movable portion protrusion-side strain portions 56 on both sides of the movable-portion regulation protrusion 32 adjacent to the movable-portion regulation protrusion 32, in which the strain gauges 20 are attached to the movable portion regulation protrusion-side strain portions 55 located on both sides thereof, among the plurality of movable-portion regulation protrusions 32.

The strain gauges 20 are respectively attached to the movable portion regulation protrusion-side strain portions 55 on both sides of the movable-portion regulation protrusion 32 facing the movable-portion regulation protrusion 32, in which the strain gauges 20 are attached to the movable portion regulation protrusion-side strain portions 55 located on both sides thereof, among the plurality of movable-portion regulation protrusions 32. The strain gauges 20 are attached to the movable portion regulation protrusion-side strain portion 55 and the movable portion protrusion-side strain portion 56 side by side on the inner peripheral side (inner side in the radial direction) and the outer peripheral side (outer side in the radial direction), respectively, and the strain gauge 20 on the outer peripheral side and the strain gauge 20 on the inner peripheral side form two Wheatstone bridge circuits W1 and W2.

Specifically, the Wheatstone bridge circuit W1 is formed by strain gauges 20a to 20h as shown in FIGS. 8 and 10. The strain gauges 20a and 20b are attached to the movable portion regulation protrusion-side strain portions 55 (hereinafter, referred to as movable portion regulation protrusion-side strain portions 55a and 55b) on both sides of one movable-portion regulation protrusion 32 (hereinafter, referred to as a movable-portion regulation protrusion 32a) among the plurality of movable-portion regulation protrusions 32, from the external member-side end surface 10a. The strain gauges 20a and 20b are configured to detect a compressive strain of the block body 10.

Strain gauges 20c and 20d are attached to the movable portion protrusion-side strain portions 56 (hereinafter, referred to as movable portion protrusion-side strain portions 56a and 56b) on both sides of the movable-portion regulation protrusion 32 (hereinafter, referred to as a movable-portion regulation protrusion 32b) adjacent to one side of the movable-portion regulation protrusion 32a, from the external member-side end surface 10a. The strain gauges 20c and 20d are configured to detect a tensile strain of the block body 10.

Strain gauges 20e and 20f are attached to the movable portion regulation protrusion-side strain portions 55 (hereinafter, referred to as movable portion regulation protrusion-side strain portions 55c and 55d) on both sides of the movable-portion regulation protrusion 32 (hereinafter, referred to as a movable-portion regulation protrusion 32c) facing the movable-portion regulation protrusion 32a, from the external member-side end surface 10a. The strain gauges 20e and 20f are configured to detect a compressive strain of the block body 10.

Strain gauges 20g and 20h are attached to the movable portion protrusion-side strain portion 56 (hereinafter, referred to as movable portion protrusion-side strain portions 56c and 56d) on both sides of the movable-portion regulation protrusion 32 (hereinafter, referred to as a movable-portion regulation protrusion 32d) adjacent to the other side of the movable-portion regulation protrusion 32a, from the external member-side end surface 10a. The strain gauges 20g and 20h are configured to detect a tensile strain of the block body 10.

As shown in FIG. 10, the strain gauges 20a and 20b are connected to one side of the Wheatstone bridge circuit W1, and the strain gauges 20e and 20f are connected to an opposite side facing the strain gauges 20a and 20b. Further, the strain gauges 20c and 20d and the strain gauges 20e and 20f are connected to sides adjacent to the sides to which the strain gauges 20a and 20b and the strain gauges 20e and 20f are connected.

A bridge voltage is input to a space between an input terminal (+) and an input terminal (−) of the Wheatstone bridge circuit W1 from bridge excitation (not shown), and a strain detection voltage corresponding to the applied load is output from a space between an output terminal (+) and an output terminal (−). In addition, the output terminal (+) and the output terminal (−) are connected to a strain measuring instrument (not shown) such as a strain static strain measuring instrument or a dynamic strain measuring instrument via a cable, and as a result, a load measuring system is formed.

The Wheatstone bridge circuit W2 is formed by strain gauges 20i to 20p as shown in FIGS. 8 and 10. The strain gauges 20i and 20j are attached to the movable portion regulation protrusion-side strain portions 55a and 55b on both sides of the movable-portion regulation protrusion 32a, from the external member-side end surface 10a. The strain gauges 20i and 20j are located closer to the inner peripheral side compared to the strain gauges 20a and 20b, and are attached side by side with the strain gauges 20a and 20b in the radial direction of the block body 10. The strain gauges 20i and 20j are configured to detect a compressive strain of the block body 10.

The strain gauges 20k and 20l are attached to the movable portion protrusion-side strain portions 56a and 56b on both sides of the movable-portion regulation protrusion 32b, from the external member-side end surface 10a. The strain gauges 20k and 20l are located closer to the inner peripheral side compared to the strain gauges 20c and 20d, and are attached side by side with the strain gauges 20c and 20d in the radial direction of the block body 10. The strain gauges 20k and 20l are configured to detect a tensile strain of the block body 10.

The strain gauges 20m and 20n are attached to the movable portion regulation protrusion-side strain portions 55c and 55d on both sides of the movable-portion regulation protrusion 32c, from the external member-side end surface 10a. The strain gauges 20m and 20n are located closer to the inner peripheral side compared to the strain gauges 20e and 20f, and are attached side by side with the strain gauges 20e and 20f in the radial direction of the block body 10. The strain gauges 20m and 20n are configured to detect a compressive strain of the block body 10.

The strain gauges 20o and 20p are attached to the movable portion protrusion-side strain portions 56c and 56d on both sides of the movable-portion regulation protrusion 32d of the movable-portion regulation protrusion 32a, from the external member-side end surface 10a. The strain gauges 20o and 20p are located closer to the inner peripheral side compared to the strain gauges 20g and 20h, and are attached side by side with the strain gauges 20g and 20h in the radial direction of the block body 10. The strain gauges 20o and 20p are configured to detect a tensile strain of the block body 10.

As shown in FIG. 10, the strain gauges 20i and 20j are connected to one side of the Wheatstone bridge circuit W2, and the strain gauges 20m and 20n are connected to an opposite side facing the strain gauges 20i and 20j. Further, the strain gauges 20k and 20l and the strain gauges 20o and 20p are connected to sides adjacent to the sides to which the strain gauges 20i and 20j and the strain gauges 20m and 20n are connected.

A bridge voltage is input to a space between an input terminal (+) and an input terminal (−) of the Wheatstone bridge circuit W2 from bridge excitation (not shown), and a strain detection voltage corresponding to the applied load is output from a space between an output terminal (+) and an output terminal (−). In addition, the output terminal (+) and the output terminal (−) are connected to a strain measuring instrument (not shown) such as a strain static strain measuring instrument or a dynamic strain measuring instrument via a cable, and as a result, a load measuring system is formed.

In the load transducer 1 according to the embodiment of the present invention, the strain gauges 20 are respectively attached to fixing portion protrusion-side strain portions 52 on both sides of one fixing-portion protrusion 31 among the plurality of fixing-portion protrusions 31. Among the plurality of fixing-portion protrusions 31, the strain gauges 20 are respectively attached to fixing portion regulation protrusion-side strain portions 53 on both sides of a fixing-portion protrusion 31 adjacent to the fixing-portion protrusion 31 including the fixing portion protrusion-side strain portions 52 on both sides and attached with the strain gauges 20.

Among the plurality of fixing-portion protrusions 31, the strain gauges 20 are respectively attached to fixing portion protrusion-side strain portions 52 on both sides of a fixing-portion protrusion 31 facing the fixing-portion protrusion 31 including the fixing portion protrusion-side strain portions 52 on both sides and attached with the strain gauges 20. The strain gauges 20 attached to the fixing portion protrusion-side strain portions 52 and the fixing portion regulation protrusion-side strain portions 53 form the Wheatstone bridge circuit W3.

Specifically, the Wheatstone bridge circuit W3 is formed by strain gauges 20q to 20x as shown in FIGS. 9 and 10. The strain gauges 20q and 20r are attached to central parts in the radial direction of the fixing portion protrusion-side strain portions 52 (hereinafter, referred to as fixing portion protrusion-side strain portions 52a and 52b) on both sides of one fixing-portion protrusion 31 (hereinafter, referred to as a fixing-portion protrusion 31a) among the plurality of fixing-portion protrusions 31, from the support member-side end surface 10b. The strain gauges 20q and 20r are configured to detect a tensile strain of the block body 10.

The strain gauges 20s and 20t are attached to central parts in the radial direction of the fixing portion regulation protrusion-side strain portions 53 (hereinafter, referred to as fixing portion regulation protrusion-side strain portions 53a and 53b) on both sides of the fixing-portion protrusion 31 (hereinafter, referred to as a fixing-portion protrusion 31b) adjacent to one side of the fixing-portion protrusion 31a, from the support member-side end surface 10b. The strain gauges 20s and 20t are configured to detect a compressive strain of the block body 10.

The strain gauges 20u and 20v are attached to central parts in the radial direction of the fixing portion protrusion-side strain portions 52 (hereinafter, referred to as fixing portion protrusion-side strain portions 52c and 52d) on both sides of the fixing-portion protrusion 31 (hereinafter, referred to as a fixing-portion protrusion 31c) facing the fixing-portion protrusion 31a, from the support member-side end surface 10b. The strain gauges 20u and 20v are configured to detect a tensile strain of the block body 10.

The strain gauges 20w and 20x are attached to central parts in the radial direction of the fixing portion regulation protrusion-side strain portions 53 (hereinafter, referred to as fixing portion regulation protrusion-side strain portions 53c and 53d) on both sides of the fixing-portion protrusion 31 (hereinafter, referred to as a fixing-portion protrusion 31d) adjacent to the other side of the fixing-portion protrusion 31a. The strain gauges 20w and 20x are configured to detect a compressive strain of the block body 10.

As shown in FIG. 10, the strain gauges 20q and 20r are connected to one side of the Wheatstone bridge circuit W3, and the strain gauges 20u and 20v are connected to an opposite side facing the strain gauges 20q and 20r. Further, the strain gauges 20s and 20t and the strain gauges 20w and 20x are connected to sides adjacent to the sides to which the strain gauges 20q and 20r and the strain gauges 20u and 20v are connected.

A bridge voltage is input to a space between an input terminal (+) and an input terminal (−) of the Wheatstone bridge circuit W3 from bridge excitation (not shown), and a strain detection voltage corresponding to the applied load is output from a space between an output terminal (+) and an output terminal (−). In addition, the output terminal (+) and the output terminal (−) are connected to a strain measuring instrument (not shown) such as a strain static strain measuring instrument or a dynamic strain measuring instrument via a cable, and as a result, a load measuring system is formed.

The load transducer 1 acts as a Roberval-type strain body, and each of the movable portion regulation protrusion-side strain portion 55, the movable portion protrusion-side strain portion 56, the fixing portion protrusion-side strain portion 52, the fixing portion regulation protrusion-side strain portion 53 is deformed by a load applied to the load transducer 1, and the load is electrically detected via the strain gauge 20. Specifically, when the load transducer 1 receives a load from the external member 200, the fixing portion 30 and the movable portion 40 are displaced, stress is generated in the movable portion regulation protrusion-side strain portion 55, the movable portion protrusion-side strain portion 56, the fixing portion protrusion-side strain portion 52, and the fixing portion regulation protrusion-side strain portion 53, and strain is generated.

Each of the strain gauges 20 detects changes in resistance due to the strain of the movable portion regulation protrusion-side strain portion 55, the movable portion protrusion-side strain portion 56, the fixing portion protrusion-side strain portion 52, and the fixing portion regulation protrusion-side strain portion 53. Then, the strain measuring instruments (not shown) of the Wheatstone bridge circuits W1 to W3 can calculate the load applied to the external member 200 by arithmetically processing the change in the resistance detected by each of the strain gauges 20.

As described above, the load transducer 1 according to the embodiment of the present invention is configured in which the movable portion 40 includes the plurality of movable-portion protrusions 41 that receives the load from the external member 200 and the fixing portions 30 includes the plurality of movable-portion regulation protrusions 32 that are provided between the plurality of movable-portion protrusions 41 and regulate the displacement of the movable portion 40. Therefore, even when an unbalanced load or an overload occurs, output variations and occurrence of damage of the load transducer 1 can be prevented.

Specifically, the load transducer 1 is configured in which the heights of the plurality of movable-portion regulation protrusions 32 in the direction of the axis Y1 are lower than the heights of the plurality of movable-portion protrusions 41 in the direction of the axis Y1. Therefore, the plurality of movable-portion regulation protrusions 32 are away from the external member 200, and since the plurality of movable-portion regulation protrusions 32 are in contact with the external member 200 and serve as the stopper even when an unbalanced load or an overload occurs on the robot arm (external member 200), the block body 10 can be prevented from being damaged due to the unbalanced load or the overload.

In addition, the load transducer 1 is configured in which the heights of the plurality of fixing-portion regulation protrusions 42 in the direction of the axis Y1 are lower than the heights of the plurality of fixing-portion protrusions 31 in the direction of the axis Y1. Therefore, the plurality of fixing-portion regulation protrusion 42 are away from the support member 100, and since the plurality of fixing-portion regulation protrusions 42 are in contact with the support member 100 and serve as the stopper even when an unbalanced load or an overload occurs on the robot arm (external member 200), the block body 10 can be prevented from being damaged due to the unbalanced load or the overload.

In addition, the load transducer 1 is configured in which the portions of the plurality of movable portions 40 protruding toward the external member 200 from the external member-side end surface 10a of the block body 10 are formed as the plurality of movable-portion protrusions 41, respectively, the portions of the plurality of movable portions 40 protruding toward the support member 100 from the support member-side end surface 10b of the block body 10 are formed as the plurality of fixing-portion regulation protrusions 42, respectively. Further, the portions of the plurality of fixing portions 30 protruding toward the support member 100 from the support member-side end surface 10b of the block body 10 are formed as the plurality of fixing-portion protrusions 31, respectively, and the portions protruding toward the external member 200 from the external member-side end surface 10a of the block body 10 are formed as the plurality of movable-portion regulation protrusions 32, respectively.

As described above, since the regulation positions of the plurality of movable-portion regulation protrusions 32 and the plurality of fixing-portion regulation protrusions 42 are shifted from each other (phased being different from each other), more movable-portion regulation protrusions 32 and fixing-portion regulation protrusions 42 serve as stoppers even when an unbalanced load or an overload occurs on the robot arm (external member 200), so that the block body 10 can be further prevented from being damaged due to the unbalanced load or the overload.

Further, the load transducer 1 is configured in which the strain gauges 20 are respectively attached to the movable portion regulation protrusion-side strain portions 55 on both sides of one movable-portion regulation protrusion 32 among the plurality of movable-portion regulation protrusions 32. Further, the strain gauges 20 are respectively attached to the movable portion protrusion-side strain portions 56 on both sides of the movable-portion regulation protrusion 32 adjacent to the movable-portion regulation protrusion 32, in which the strain gauges 20 are attached to the movable portion regulation protrusion-side strain portions 55 located on both sides thereof, among the plurality of movable-portion regulation protrusions 32. The strain gauges 20 are respectively attached to the movable portion regulation protrusion-side strain portions 55 on both sides of the movable-portion regulation protrusion 32 facing the movable-portion regulation protrusion 32, in which the strain gauges 20 are attached to the movable portion regulation protrusion-side strain portions 55 located on both sides thereof, among the plurality of movable-portion regulation protrusions 32. Therefore, even when an unbalanced load or an overload occurs on the robot arm (external member 200), the load applied to the block body 10 can be accurately detected by the strain gauges 20 disposed as described above and variations in the output of the load transducer 1 can be prevented.

Further, the load transducer 1 is configured in which the strain gauges 20 are attached to the movable portion regulation protrusion-side strain portion 55 and the movable portion protrusion-side strain portion 56 side by side on the inner peripheral side and the outer peripheral side, respectively, and the strain gauge 20 on the outer peripheral side and the strain gauge 20 on the inner peripheral side form two Wheatstone bridge circuits W1 and W2. In addition, the strain gauges 20 attached to the fixing portion protrusion-side strain portion 52 and the fixing portion regulation protrusion-side strain portion 53 form the Wheatstone bridge circuit W3. Therefore, even when an unbalanced load or an overload occurs on the robot arm (external member 200), the load applied to the block body 10 can be accurately detected by the strain gauges 20 disposed as described above and variations in the output of the load transducer 1 can be prevented.

As described above, according to the load transducer 1 of the present invention, even when an unbalanced load or an overload occurs on the robot arm (external member 200), output variations and occurrence of damage of the load transducer 1 can be prevented.

Although the embodiment of the present invention has been described above, the present invention is not limited to the embodiment described above and includes all aspects included in the concept and claims of the present invention. Furthermore, the configurations may be selectively combined as appropriate so as to achieve at least a part of the effects described above. For example, the shape, the material, arrangement and size of each component in the above-described embodiment can be appropriately changed depending on the specific usage mode of the present invention.

For example, in the load transducer 1 according to the embodiment of the present invention, the case has been described as the embodiment of the present invention in which the block body 10 is formed by four fixing portions 30, four movable portions 40, and eight beam portions 50. However, the present invention is not limited thereto, the block body 10 may be formed by, for example, six fixing portions 30, six movable portions 40, and twelve beam portions 50, or the block body 10 may be formed by any number of fixing portions, movable portions, and beam portions.

In the load transducer 1 according to the embodiment of the present invention, the case has been described as the embodiment of the present invention in which the bone-shaped through hole 60 is formed to penetrate the inner peripheral surface 50c and the outer peripheral surface 50d at the central part of the inner peripheral surface 50c and the outer peripheral surface 50d of the plurality of beam portions 50. However, the present invention is not limited thereto, and for example, a so-called eyeglass-shaped through hole 60 may be formed in which each of the support member-side coupling hole 62 and the external member-side coupling hole 65 extends in the columnar shape in the radial direction of the block body 10, or a through hole 60 having various shape is applicable.

In the load transducer 1 according to the embodiment of the present invention, the case has been described as the embodiment of the present invention in which the load transducer 1 includes the Wheatstone bridge circuits W1 to W3 formed by the strain gauges 20. However, the present invention is not limited thereto, and for example, the load transducer 1 may include only one Wheatstone bridge circuit of the Wheatstone bridge circuits W1 to W3, or the strain gauges 20 may be respectively attached to the movable portion regulation protrusion-side strain portions 55 on both sides of one movable-portion regulation protrusion 32 among the plurality of movable-portion regulation protrusions 32.

LIST OF REFERENCE SIGNS 1 load transducer,
10 block body,
10a external member-side end surface,
10b support member-side end surface,
11 opening,
20 (20a to 20x) strain gauge,
30 fixing portion,
30a facing surface,
30b facing surface,
30c through hole,
31 fixing-portion protrusion,
32 movable-portion regulation protrusion,
33 groove,
42 fixing-portion regulation protrusion,
40 movable portion,
40a facing surface,
40b facing surface,
40c bottomed hole,
41 movable-portion protrusion,
42 fixing-portion regulation protrusion,
43, 44 groove,
50 beam portion,
50a facing surface,
50b facing surface,
50c inner peripheral surface,
50d outer peripheral surface,
51 support member-side beam member,
51a inside surface,
52 fixing portion protrusion-side strain portion,
53 fixing portion regulation protrusion-side strain portion,
54 external member-side beam member,
54a inside surface,
55 movable portion regulation protrusion-side strain portion,
56 movable portion protrusion-side strain portion,
60 through hole,
61 slit hole,
62 support member-side coupling hole,
63 fixing portion protrusion-side coupling hole,
64 fixing portion regulation protrusion-side coupling hole,
65 external member-side coupling hole,
66 movable portion regulation protrusion-side coupling hole,
67 movable portion protrusion-side coupling hole,
100 support member,
200 external member,
W1 to W3 Wheatstone bridge circuit,
Y1 axis

The invention claimed is:

1. A load transducer, comprising:
a block body; and
a strain gauge attached to the block body, wherein
the block body includes a plurality of fixing portions to be fixed to a support member, a plurality of movable portions provided respectively between the plurality of fixing portions and receiving a load from an external member, and a plurality of beam portions extending respectively between the fixing portions and the movable portions, the block body being formed in a tubular shape,
the movable portions include a plurality of movable-portion protrusions receiving the load from the external member, and
the fixing portions include a plurality of movable-portion regulation protrusions provided between the plurality of movable-portion protrusions to regulate displacement of the movable portions,
the fixing portions include a plurality of fixing-portion protrusions supported by the support member; and
the movable portions include a plurality of fixing-portion regulation protrusions provided between the plurality of fixing-portion protrusions to regulate displacement of the fixing portions.

2. The load transducer according to claim 1, wherein:
each of the plurality of beam portions includes an external member-side beam member provided closer to the external member;
each of the external member-side beam members includes a movable portion protrusion-side strain portion provided closer to the movable-portion protrusion and a movable portion regulation protrusion-side strain portion provided closer to the movable-portion regulation protrusion; and
strain gauges are respectively attached to movable portion regulation protrusion-side strain portions on both sides of one movable-portion regulation protrusion among a plurality of movable-portion regulation protrusions.

3. The load transducer according to claim 2, wherein among the plurality of movable-portion regulation protrusions, strain gauges are respectively attached to movable portion protrusion-side strain portions on both sides of a movable-portion regulation protrusion adjacent to the movable-portion regulation protrusion including the movable portion regulation protrusion-side strain portions provided on both sides and attached with the strain gauges.

4. The load transducer according to claim 2, wherein among the plurality of movable-portion regulation protrusions, strain gauges are respectively attached to movable portion regulation protrusion-side strain portions on both sides of a movable-portion regulation protrusion facing the movable-portion regulation protrusion including the movable portion regulation protrusion-side strain portions provided on both sides and attached with the strain gauges.

5. The load transducer according to claim 1, wherein:
the plurality of beam portions respectively include support member-side beam members provided closer to the support member;
each of the support member-side beam members includes a fixing portion protrusion-side strain portion provided closer to the fixing-portion protrusion and a fixing portion regulation protrusion-side strain portion provided closer to the fixing-portion regulation protrusion; and strain gauges are respectively attached to fixing portion protrusion-side strain portions on both sides of one fixing-portion protrusion among the plurality of fixing-portion protrusions.

6. The load transducer according to claim 5, wherein among the plurality of fixing-portion protrusions, strain gauges are respectively attached to fixing portion regulation protrusion-side strain portions on both sides of a fixing-portion protrusion adjacent to the fixing-portion protrusion including the fixing portion protrusion-side strain portions on both sides and attached with the strain gauges.

7. The load transducer according to claim 5, wherein among the plurality of fixing-portion protrusions, strain gauges are respectively attached to fixing portion protrusion-side strain portions on both sides of a fixing-portion protrusion facing the fixing-portion protrusion including the fixing portion protrusion-side strain portions on both sides and attached with the strain gauges.

8. The load transducer according to claim 5, wherein the strain gauges attached to the fixing portion protrusion-side strain portions and the fixing portion regulation protrusion-side strain portions form a bridge circuit.

9. The load transducer according to claim 2, wherein the strain gauges are attached to the movable portion regulation protrusion-side strain portions and the movable portion protrusion-side strain portions side by side on an inner side and an outer side in a radial direction, respectively, and the strain gauges on the outer side and the inner side in the radial direction form two bridge circuits.

10. The load transducer according to claim 5, wherein a plurality of strain gauges attached to the external member-side beam member and a plurality of strain gauges attached to the support member-side beam portion are disposed at corresponding positions in an axis direction of the block body.

* * * * *